United States Patent
Sun et al.

(10) Patent No.: US 10,768,071 B2
(45) Date of Patent: Sep. 8, 2020

(54) TESTING MACHINE FOR ACCURATELY CONTROLLING LOOSENESS OF TRANSVERSE LOAD

(71) Applicant: DALIAN UNIVERSITY OF TECHNOLOGY, Dalian, Liaoning Province (CN)

(72) Inventors: Qingchao Sun, Dalian (CN); Bao Zhang, Dalian (CN); Chuanhua Wang, Dalian (CN); Wei Sun, Dalian (CN); Yue Ma, Dalian (CN)

(73) Assignee: DALIAN UNIVERSITY OF TECHNOLOGY, Dalian, Liaoning (CN)

( * ) Notice: Subject to any disclaimer, the term of this patent is extended or adjusted under 35 U.S.C. 154(b) by 50 days.

(21) Appl. No.: 16/338,906

(22) PCT Filed: Sep. 11, 2017

(86) PCT No.: PCT/CN2017/101160
§ 371 (c)(1),
(2) Date: Apr. 2, 2019

(87) PCT Pub. No.: WO2019/024175
PCT Pub. Date: Feb. 7, 2019

(65) Prior Publication Data
US 2019/0242779 A1    Aug. 8, 2019

(30) Foreign Application Priority Data
Aug. 2, 2017   (CN) .......................... 2017 1 0644182

(51) Int. Cl.
*G01L 5/00*       (2006.01)
*G01M 5/00*      (2006.01)
(Continued)

(52) U.S. Cl.
CPC ............ *G01M 5/005* (2013.01); *G01D 5/202* (2013.01); *G01L 5/00* (2013.01); *G01M 13/00* (2013.01)

(58) Field of Classification Search
CPC ...... G01M 5/005; G01M 13/00; G01D 5/202; G01L 5/00
(Continued)

(56) References Cited

U.S. PATENT DOCUMENTS 4,163,142 A  *  7/1979  Descovich  ............. B23K 11/02
                                                    219/79
4,501,366 A  *  2/1985  Thompson  .............. G01M 3/38
                                                    209/556
(Continued)

FOREIGN PATENT DOCUMENTS

CN          102865983 A       1/2013
CN          203101008 U       7/2013
(Continued)

*Primary Examiner* — Max H Noori
(74) *Attorney, Agent, or Firm* — Muncy, Geissler, Olds & Lowe, P.C.

(57) ABSTRACT

The present invention provides a testing machine for accurately controlling looseness of a transverse load, and belongs to the technical field of mechanical testing devices. The testing machine for accurately controlling looseness of the transverse load uses a motor to control the generated transverse displacement, controls the generated transverse load by controlling the motor, and controls the motor through signal feedback from the sensor to keep the generated transverse load basically stable within a small range of a fixed value. Unlike the existing testing machine for looseness of the transverse load that can only provide one fixed transverse displacement load, the present invention can provide a desired stable transverse displacement load and (Continued)

(Fig.2 as an illustration in Abstract)

can provide a desired stable transverse force load to adapt to simulation experiments for different bolt loading conditions.

1 Claim, 2 Drawing Sheets

(51) Int. Cl.
*G01D 5/20* (2006.01)
*G01M 13/00* (2019.01)
(58) Field of Classification Search
USPC .......................................................... 73/761
See application file for complete search history.

(56) References Cited

U.S. PATENT DOCUMENTS

| | | | | |
|---|---|---|---|---|
| 4,569,225 A | * | 2/1986 | Ehm | ........................ G01N 3/12 |
| | | | | 73/49.4 |
| 5,786,526 A | * | 7/1998 | Byon | ...................... B60R 21/16 |
| | | | | 73/12.01 |
| 6,023,173 A | * | 2/2000 | Khater | ............... G01R 1/06705 |
| | | | | 324/750.25 |
| 2006/0273815 A1 | * | 12/2006 | Johnston | ............ G01R 31/2893 |
| | | | | 324/750.19 |
| 2011/0214506 A1 | * | 9/2011 | Khoury | .................. G01N 33/24 |
| | | | | 73/784 |
| 2016/0146681 A1 | * | 5/2016 | Sun | ..................... G01M 13/005 |
| | | | | 73/862.191 |

FOREIGN PATENT DOCUMENTS

| | | |
|---|---|---|
| CN | 104655379 A | 5/2015 |
| CN | 105784304 A | 7/2016 |
| CN | 106441838 A | 2/2017 |
| CN | 107621361 A | 1/2018 |
| DK | 200900783 L | 12/2010 |
| JP | 3144692 U | 9/2008 |

\* cited by examiner

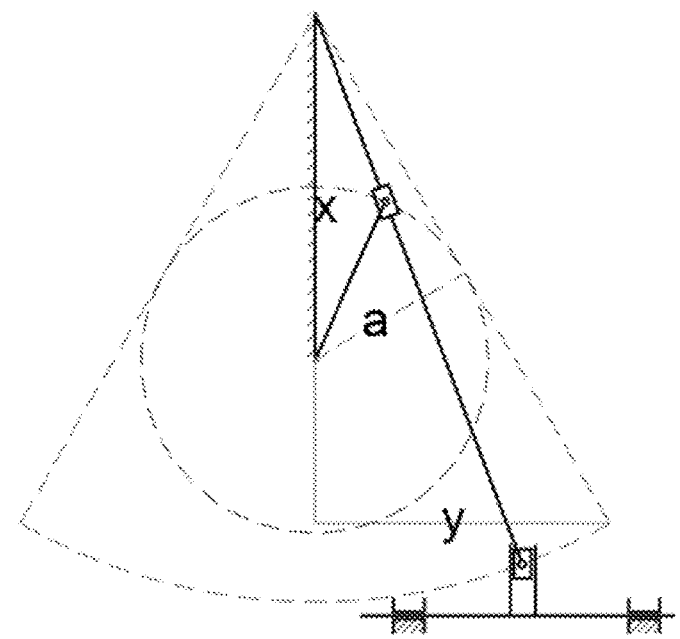
Fig. 1
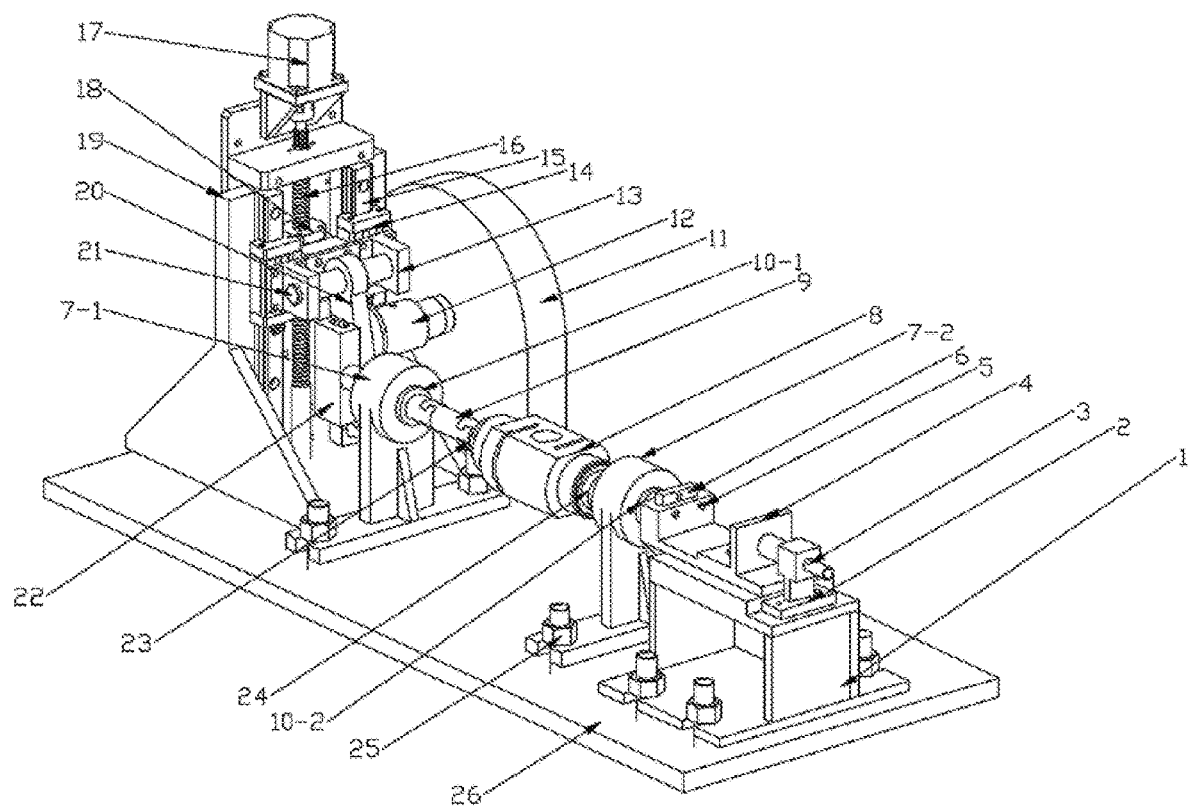
Fig. 2(Fig.2 as an illustration in Abstract)

TESTING MACHINE FOR ACCURATELY CONTROLLING LOOSENESS OF TRANSVERSE LOAD

TECHNICAL FIELD

The present invention belongs to the technical field of mechanical testing devices, and relates to a testing machine for accurately controlling looseness of a transverse load.

BACKGROUND

The testing machine for the looseness of the transverse load can be used to research looseness under the condition that the bolt bears horizontal alternating load, and the current testing machines for the looseness of the transverse load are classified into the following categories:

1. Junker Type Looseness Testing Method

For example, GB/T 10431-2008. A Junker type looseness testing machine primarily applies an alternating transverse load to a fastener that applies a pretightening force to enable the fastener to move transversely. This transverse motion causes relative swing between a bolt and a nut, thereby resulting in microscopic slip of a larger thread contact surface and rapid looseness of the fastener. This allows the fastener to loosen faster than any previous testing method.

2. Electro-Hydraulic Servo-Controlled Vibration Method

During test, a tested fastener is tightened on a clamping platform, and a specified pretightening force is produced. An alternating transverse displacement is produced between two clamped metal plates through a servo hydraulic cylinder, resulting in reduction or even loss of a clamping force. The instantaneous clamping forces are continuously recorded, and the anti-loose performance of the fastener is judged by comparison.

3. NAS Vibration Testing Method

A specimen is tightened into a test sleeve, and location marks are made on a part and the sleeve. Then, the sleeve is placed on a vibration testbed for moving back and forth. After starting, the sleeve impacts both ends of a guide groove back and forth in the guide groove, producing a large impact force and causing looseness of the specimen. During the test, the position change of the specimen is recorded with regular stop, and the anti-loose performance of the specimen is judged accordingly.

The above methods are feasible for some actual working conditions, that is, when some bolts mainly play a limiting role, the bolts only transversely move alternately within a fixed displacement. However, the methods are not applicable to the case where some bolts are used for transverse loading, i.e., the bolts are subjected to a fixed transverse force.

When the transverse load force F applied to the bolts during work is not changed, with the looseness of the bolts, the transverse displacement produced by the transverse load force F is always changed. However, in the Junker type looseness testing machine, a transverse displacement load A applied to the bolts is not changed. However, with the looseness of the bolts, a horizontal load produced by the transverse displacement load A is always changed. The two working states are contrary, and thus are not accurate. The testing machine shall ensure a fixed transverse load force, so as to better simulate single-bolt looseness during the work. At present, there is no patent related to a testing machine for looseness of a bolt transverse load. The testing machine is optimized based on this consideration.

SUMMARY

To solve the above-mentioned problems, the present invention provides a testing machine for accurately controlling looseness of a transverse load. The schematic diagram of motion of the mechanism is shown in the figure. Different horizontal displacement amplitudes y can be obtained by changing the length of x, and the relational expression is: y is equal to a ratio of ax to the square root of $(x^2-a^2)$.

The technical solution of the present invention is:

A testing machine for accurately controlling looseness of a transverse load comprises a load transfer part and a load control part.

The load transfer part comprises a flame structural member 1, a displacement sensor support frame 2, a current vortex displacement sensor 3, a connecting plate 4, a pin 5, a limiting plate 6, a first support frame 7-1, a second support frame 7-2, an S-shaped column type displacement sensor 8, an elastic rod 9, a first linear bearing 10-1, a second linear bearing 10-2, a T-groove guide rail 22, a short-head threaded rod 23, a long-head threaded rod 24, a base station 26, a rotatable rod 27, a round cushion 28, a spacer type pressure sensor 29, a sleeve 30 and a specimen bolt 31; two support frames and the frame structural member 1 are fixed to the base station 26; the two support frames are coaxial and are spaced by a certain distance; the frame structural member 1 is located at one side of the two support frames; the T-groove guide rail 22 penetrates through the first linear bearing 10-1; the first linear bearing 10-1 is fixed to the first support frame 7-1; the T-groove guide rail 22 is tenoned with one end of the elastic rod 9; the other end of the elastic rod 9 is tenoned with the short-head threaded rod 23; the short-head threaded rod 23 is in thread fit with one end of the S-shaped column type displacement sensor 8; the other end of the S-shaped column type displacement sensor 8 is in thread fit with the long-head threaded rod 24; the long-head threaded rod 24 penetrates through the second linear bearing 10-2; the second linear bearing 10-2 is fixed to the second support frame 7-2; the long-head threaded rod 24 is tenoned with the rotatable rod 27; the rotatable rod 27 is placed in a U-groove of the connecting plate 4 and is limited through the limiting plate 6; the connecting plate 4 is placed on an upper stair of the frame structural member 1; the displacement sensor support frame 2 is fixed to a lower stair of the frame structural member 1; the current vortex displacement sensor 3 is fixed to the displacement sensor support frame 2; the plane of the frame structural member 1 is in a stair type;

a through hole is formed in the connecting plate 4; the round cushion 28 is in interference fit with the through hole; a stepped hole is formed in the plane of the frame structural member 1; the stepped hole is coaxial with the through hole; the spacer type pressure sensor 29 is placed in the stepped hole; the sleeve 30 penetrates through the spacer type pressure sensor 29; the specimen bolt 31 penetrates through the stepped hole and the through hole successively and is fixed;

the load control part comprises a load generating motor 11, an eccentric coupling 12, dual brackets 13, slide blocks 14, guide rails 15, a screw rod 16, a load control motor 17, a slide table 18, a stress frame 19, a rocking bar 20 and a shaft 21; the stress frame 19 is composed of a transverse bracket, a longitudinal bracket and a base; the stress frame 19 is fixed to the base station 26 through the base; one end of the screw rod 16 penetrates through the transverse bracket, and is connected with the load control motor 17; the load control motor 17 is fixed to the longitudinal bracket; the other end of the screw rod 16 is fixed to the base; the slide table 18 is connected with a ball screw rod structure of the screw rod 16 together; two guide rails 15 are fixed to the longitudinal bracket; two slide blocks 14 are sheathed on the guide rails 15; dual brackets 13 are composed of two side plates and a bottom plate; the bottom plate is fixed to the two slide blocks 14 and the slide table 18; the shaft 21 penetrates through the two side plates of dual brackets 13 and is fixed; one end of the rocking bar 20 is a round sleeve structure; the other end is provided with a notch and a T type lug boss; the through hole of the rocking bar 20 penetrates through the shaft 21 and is located between the two side plates; the load generating motor 11 is fixed to the base station 26; one end of the eccentric coupling 12 is connected with an output shaft of the load generating motor 11; the other end of the eccentric coupling 12 is limited to the notch of the rocking bar 20; and the T type lug boss of the rocking bar 20 is matched with the T-groove guide rail 22.

A testing method for the testing machine for accurately controlling looseness of a transverse load comprises the following steps:

1. Ensuring Transverse Displacement Load

It can be known from the formula that a fixed x value corresponds to a unique y value. Through rotation of the load control motor 17, the screw rod 16 is driven so as to drive the slide table 18 to move up and down. The shaft 21 on the dual brackets 13 moves up and down due to the up and down motion of the slide table, namely, displacement is produced at the end of the rocking bar 20. If the x value is changed, the maximum amplitude of the generated transverse displacement is also changed. Each position at the end of the rocking bar 20 represents the maximum amplitude of one transverse displacement. A desired transverse displacement can be obtained by controlling the load control motor 17.

2. Ensuring Transverse Force Load

When the testing machine provides a transverse displacement amplitude, a transverse force load will be generated simultaneously. Along with the occurrence of looseness, the transverse force load generated by the fixed transverse displacement is gradually decreased. At this moment, if a fixed transverse force load needs to be unchanged, the generated transverse displacement amplitude shall be gradually increased. At this moment, the load control motor is controlled to increase the generated transverse displacement load until the force measured by the S-shaped column type tension sensor reaches a predetermined value.

3. Round cushions 28 having a series of sizes with the same diameter and different thicknesses are processed. The round cushions having different thicknesses are put into the connecting plate 4, and then experiments can be carried out for connecting plates having different thicknesses.

The present invention has the beneficial effects: the present invention aims to propose a testing machine structure that can accurately control the load size. The design uses a motor to control the generated transverse displacement, controls the generated transverse load by controlling the motor, and controls the motor through signal feedback from the sensor to keep the generated transverse load basically stable within a small range of a fixed value. Unlike the existing testing machine for looseness of the transverse load that can only provide one fixed transverse displacement load, the present invention can provide a desired stable transverse displacement load and can provide a desired stable transverse force load to adapt to simulation experiments for different bolt loading conditions.

DESCRIPTION OF DRAWINGS

FIG. 1 is a schematic diagram of motion of a mechanism.
FIG. 2 is a trimetric drawing of a whole testbed.

DETAILED DESCRIPTION

Figure 3:
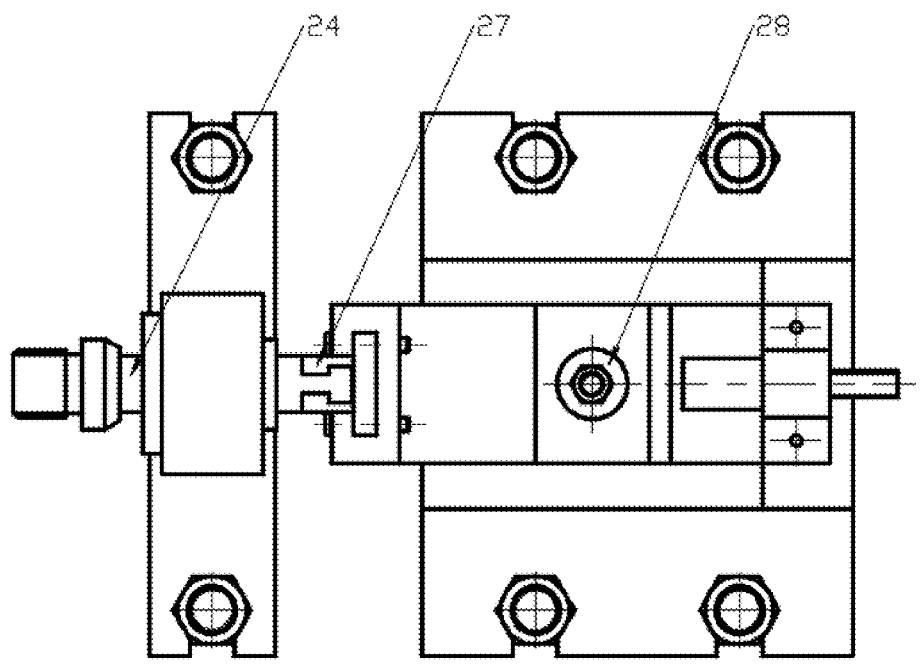
FIG. 3 is a partial top view of a clamp.
Figure 4:
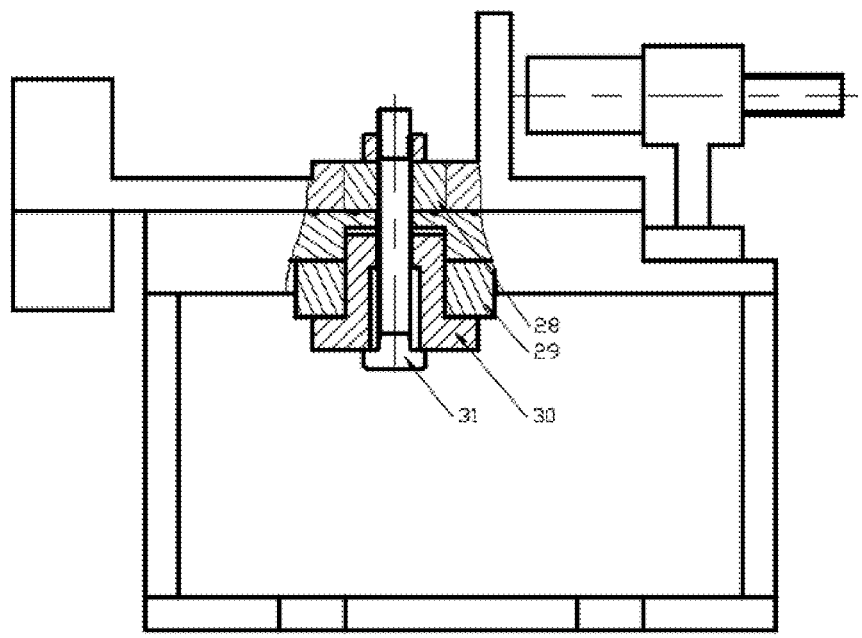
FIG. 4 is a clamp structure.
In the figures: 1 frame structural member; 2 displacement sensor support frame; 3 current vortex displacement sensor; 4 connecting plate;
5 pin; 6 limiting plate; 7-1 first support frame; 7-2 second support frame; 8 S-shaped column type displacement sensor;
9 elastic rod; 10-1 first linear bearing; 10-2 second linear bearing; 11 load generating motor;
12 eccentric coupling; 13 dual brackets; 14 slide block; 15 guide rail; 16 screw rod; 17 load control motor;
18 slide table; 19 stress frame; 20 rocking bar; 21 shaft; 22 T-groove guide rail; 23 short-head threaded rod;
24 long-head threaded rod; 25 T type bolt; 26 base station; 27 rotatable rod; 28 round cushion;
29 spacer type pressure sensor; 30 sleeve; and 31 specimen bolt.

Detailed description of the present invention is further described below in combination with accompanying drawings and the technical solution.

A load generating motor 11 rotates. A motor shaft is connected with an eccentric coupling 12. The displacement is transferred to a T-groove guide rail through a rocking bar 21 to form a transverse displacement. An elastic rod 9 plays a buffer action. An S-shaped column type pressure sensor 8 measures and records a generated axial force. Then, a transverse load pulls a connecting plate. When the transverse force load is transferred to a specimen bolt for connection, a current vortex displacement sensor 3 measures and records the transverse displacement load generated by the transverse force load. Meanwhile, a gasket type pressure sensor measures and records an axial pretightening force of the bolt.

A force value collected by the S-shaped column type pressure sensor 8 is fed back into a control system of a load control motor 17. The load control motor 17 drives a screw rod 16 to enable a slide table 18 to move down. Downward motion of the slide table makes a shaft 21 on dual brackets 13 move down, i.e., a downward displacement is produced at the end of the rocking bar 20. The decreased value of x is changed. The maximum amplitude of the generated transverse displacement increases accordingly, and then the generated transverse force load also increases accordingly. The transverse force load will eventually return to an expected value through several gradual adjustments.

The structure of a load transfer part is installed. Firstly, a first support frame 7-1 is fixed to a base station 26 through a T type bolt 25; a first linear bearing 10-1 is fixed by penetrating through the first support frame 7-1; and a T-groove guide rail 22 penetrates through the first linear bearing 10-1. Then, the elastic rod 9 is buckled at one end of the T-groove guide rail 22. A short-head threaded rod 23 and a long-head threaded rod 24 are respectively screwed on both ends of the S-shaped column type displacement sensor 8 for standby. A second linear bearing 10-2 is fixed by penetrating through a second support frame 7-2 to act as a right support. Next, the long end of the S-shaped column type pressure sensor 8 having the short-head threaded rod 23 and the long-head threaded rod 24 penetrates through the interior of the second linear bearing 10-2 as the right support. The whole S-shaped column type pressure sensor 8 is buckled at the other end of the elastic rod 9. Meanwhile, the second support frame 7 is fixed to the base station 26 through the T type bolt 25.

Then, a frame structural member 1 is placed on the base station 26 using the T type bolt 25, and is not tightened. The current vortex displacement sensor 3 penetrates through the displacement sensor support frame 2 and is tightened and fixed. The displacement sensor support frame 2 is fixed to the frame structural member 1. Then, the connecting plate 4 is placed on the frame structural member 1, and a rotatable rod 27 is placed in a U groove of the connecting plate 4. Then, the long-head threaded rod 24 is buckled, and finally a limiting plate 6 is put, and two pins 5 are inserted. Finally, the T type bolt 25 is tightened, and the frame structural member 1 is fixed to the base station 26 to complete the assembly of the transverse displacement load part.

The structure of a load control part is installed. Firstly, a stress frame 19 is placed on the base station 26 using the T type bolt 25, and is not tightened. Then, a guide rail 15 is installed on the stress frame 19. Two slide blocks 14 are sheathed on the guide rail 15. Next, the dual brackets 13 are fixed, and penetrate through the shaft 21 and the rocking bar 20. A clamp spring is clamped. Subsequently, a slide table 18 penetrates into the screw rod 16, and the screw rod 16 is also fixed to the stress frame 19. Then, the slide table 18 and the dual brackets 13 are connected together. The load control motor 17 is installed on the screw rod 16. Finally, the rocking bar 20 is sheathed on the T-groove guide rail 22. The T type bolt 25 is tightened, and the stress frame 19 is fixed to the base station 26. The eccentric coupling 12 is sheathed on the shaft of the load generating motor 11. Then, the eccentric coupling 12 is sheathed into the rocking bar 20, and the load generating motor 11 is tightened and fixed to the base station 26 to complete the assembly.

Test Method:

1. Ensuring Transverse Displacement Load

It can be known from the formula that a fixed x value corresponds to a unique y value. Through rotation of the load control motor 17, the screw rod 16 is driven so as to drive the slide table 18 to move up and down. If the x value is changed, the shaft 21 on the dual brackets 13 moves up and down due to the up and down motion of the slide table, namely, displacement is produced at the end of the rocking bar 20 so that the y value is changed. That is, the maximum amplitude of the generated transverse displacement is also changed. Each position at the end of the rocking bar 20 represents the maximum amplitude of one transverse displacement. A desired transverse displacement can be obtained by controlling the load control motor 17.

2. Ensuring Transverse Force Load

When the testing machine provides a transverse displacement amplitude, a transverse force load will be generated simultaneously. Along with the occurrence of looseness, the transverse force load generated by the fixed transverse displacement is gradually decreased. At this moment, if a fixed transverse force load needs to be unchanged, the generated transverse displacement amplitude shall be gradually increased.

3. Round cushions 28 having a series of sizes with the same diameter and different thicknesses are processed. The round cushions having different thicknesses are put into the connecting plate 4, and then experiments can be carried out for connecting plates having different thicknesses.

We claim:

1. A testing machine for accurately controlling looseness of transverse load, wherein the testing machine for accurately controlling the looseness of the transverse load comprising a load transfer part and a load control part;

the load transfer part comprises a frame structural member (1), a displacement sensor support frame (2), a current vortex displacement sensor (3), a connecting plate (4), a pin (5), a limiting plate (6), a first support frame (7-1), a second support frame (7-2), an S-shaped column type displacement sensor (8), an elastic rod (9), a first linear bearing (10-1), a second linear bearing (10-2), a T-groove guide rail (22), a short-head threaded rod (23), a long-head threaded rod (24), a base station (26), a rotatable rod (27), a round cushion (28), a spacer type pressure sensor (29), a sleeve (30) and a specimen bolt (31); two support frames and the frame structural member (1) are fixed to the base station (26); the two support flames are coaxial and are spaced by a certain distance; the frame structural member (1) is located at one side of the two support frames; the T-groove guide rail (22) penetrates through the first linear bearing (10-1); the first linear bearing (10-1) is fixed to the first support frame (7-1); the T-groove guide rail (22) is tenoned with one end of the elastic rod (9); the other end of the elastic rod (9) is tenoned with the short-head threaded rod (23); the short-head threaded rod (23) is in thread fit with one end of the S-shaped column type displacement sensor (8); the other end of the S-shaped column type displacement sensor (8) is in thread fit with the long-head threaded rod (24); the long-head threaded rod (24) penetrates through the second linear bearing (10-2); the second linear bearing (10-2) is fixed to the second support frame (7-2); the long-head threaded rod (24) is tenoned with the rotatable rod (27); the rotatable rod (27) is placed in a U-groove of the connecting plate (4) and is limited through the limiting plate (6); the connecting plate (4) is placed on an upper stair of the frame structural member (1); the displacement sensor support frame (2) is fixed to a lower stair of the frame structural member (1); the current vortex displacement sensor (3) is fixed to the displacement sensor support frame (2); the plane of the frame structural member (1) is in a stair type;

a through hole is formed in the connecting plate (4); the round cushion (28) is in interference fit with the through hole; a stepped hole is formed in the plane of the frame structural member (1); the stepped hole is coaxial with the through hole; the spacer type pressure sensor (29) is placed in the stepped hole; the sleeve (30) penetrates through the spacer type pressure sensor (29); the specimen bolt (31) penetrates through the stepped hole and the through hole successively and is fixed;

the load control part comprises a load generating motor (11), an eccentric coupling (12), dual brackets (13), slide blocks (14), guide rails (15), a screw rod (16), a load control motor (17), a slide table (18), a stress frame (19), a rocking bar (20) and a shaft (21); the stress frame (19) is composed of a transverse bracket, a longitudinal bracket and a base; the stress frame (19) is fixed to the base station (26) through the base; one end of the screw rod (16) penetrates through the transverse bracket, and is connected with the load control motor (17); the load control motor (17) is fixed to the longitudinal bracket; the other end of the screw rod (16) is fixed to the base; the slide table (18) is connected with a ball screw rod structure of the screw rod (16) together; two guide rails (15) are fixed to the longitudinal bracket; two slide blocks (14) are sheathed on the guide rails (15); dual brackets (13) are composed of two side plates and a bottom plate; the bottom plate is fixed to the two slide blocks (14) and the slide table (18); the shaft (21) penetrates through the two side plates of dual brackets (13) and is fixed; one end of the rocking bar (20) is a round sleeve structure; the other end is provided with a notch and a T type lug boss; the through hole of the rocking bar (20) penetrates through the shaft (21) and is located between the two side plates; the load generating motor (11) is fixed to the base station (26); one end of the eccentric coupling (12) is connected with an output shaft of the load generating motor (11); the other end of the eccentric coupling (12) is limited to the notch of the rocking bar (20); and the T type lug boss of the rocking bar (20) is matched with the T-groove guide rail (22).

\* \* \* \* \*